(12) United States Patent
Joshi et al.

(10) Patent No.: US 12,447,518 B2
(45) Date of Patent: Oct. 21, 2025

(54) METHOD FOR FORMING HOLLOW PROFILE NON-CIRCULAR EXTRUSIONS USING SHEAR ASSISTED PROCESSING AND EXTRUSION (ShAPE)

(71) Applicant: Battelle Memorial Institute, Richland, WA (US)

(72) Inventors: Vineet V. Joshi, Richland, WA (US); Scott A. Whalen, West Richland, WA (US); Curt A. Lavender, Richland, WA (US); Glenn J. Grant, Benton City, WA (US); Md. Reza-E-Rabby, Richland, WA (US); Aashish Rohatgi, Richland, WA (US); Jens T. Darsell, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 17/985,611

(22) Filed: Nov. 11, 2022

(65) Prior Publication Data
US 2023/0081786 A1 Mar. 16, 2023

Related U.S. Application Data

(60) Continuation of application No. 17/175,464, filed on Feb. 12, 2021, now Pat. No. 11,534,811, which is a
(Continued)

(51) Int. Cl.
*B21C 25/02* (2006.01)
*B21C 23/00* (2006.01)
(Continued)

(52) U.S. Cl.
CPC ............ *B21C 25/02* (2013.01); *B21C 23/002* (2013.01); *B21C 23/08* (2013.01); *B21C 23/142* (2013.01);
(Continued)

(58) Field of Classification Search
CPC ..... B21C 23/001; B21C 23/002; B21C 23/01; B21C 23/04; B21C 23/08; B21C 23/085;
(Continued)

(56) References Cited

U.S. PATENT DOCUMENTS

| 3,432,369 A | 3/1969 | Naastepad |
| 3,640,657 A | 2/1972 | Rowe et al. |

(Continued)

FOREIGN PATENT DOCUMENTS

| CN | 106140847 A | 11/2016 |
| CN | 107282671 A | 10/2017 |

(Continued)

OTHER PUBLICATIONS

CN-105925846-B translation provided by FIT database (Year: 2024).*
(Continued)

*Primary Examiner* — Jeffrey T Carley
*Assistant Examiner* — Joshua D Anderson
(74) *Attorney, Agent, or Firm* — Schwegman, Lundberg & Woessner, P.A.

(57) ABSTRACT

A process for forming extruded products using a device having a scroll face configured to apply a rotational shearing force and an axial extrusion force to the same preselected location on material wherein a combination of the rotational shearing force and the axial extrusion force upon the same location cause a portion of the material to plasticize, flow and recombine in desired configurations. This process provides for a significant number of advantages and industrial applications, including but not limited to extruding tubes used for vehicle components with 50 to 100 percent greater ductility and energy absorption over conventional extrusion technologies, while dramatically reducing manufacturing costs.

28 Claims, 9 Drawing Sheets

Related U.S. Application Data division of application No. 16/028,173, filed on Jul. 5, 2018, now Pat. No. 11,045,851, which is a continuation-in-part of application No. 15/898,515, filed on Feb. 17, 2018, now Pat. No. 10,695,811, which is a continuation-in-part of application No. 15/351,201, filed on Nov. 14, 2016, now Pat. No. 10,189,063, which is a continuation-in-part of application No. 14/222,468, filed on Mar. 21, 2014, now abandoned.

(60) Provisional application No. 62/460,227, filed on Feb. 17, 2017, provisional application No. 62/313,500, filed on Mar. 25, 2016, provisional application No. 61/804,560, filed on Mar. 22, 2013.

(51) Int. Cl.
*B21C 23/08* (2006.01)
*B21C 23/14* (2006.01)
*B21C 23/21* (2006.01)
*B21C 27/00* (2006.01)
*B21C 29/00* (2006.01)
*B21C 33/00* (2006.01)
*B21C 37/15* (2006.01)
*B22F 3/20* (2006.01)
*C22C 1/04* (2023.01)

(52) U.S. Cl.
CPC ............ *B21C 23/218* (2013.01); *B21C 27/00* (2013.01); *B21C 29/003* (2013.01); *B21C 33/00* (2013.01); *B21C 23/215* (2013.01); *B21C 37/155* (2013.01); *B22F 2003/208* (2013.01); *B22F 2301/058* (2013.01); *C22C 1/0408* (2013.01); *C22C 1/0416* (2013.01); *C22C 1/0425* (2013.01)

(58) Field of Classification Search
CPC ..... B21C 23/18; B21C 23/183; B21C 23/186; B21C 23/20; B21C 23/205; B21C 23/21; B21C 23/212; B21C 23/217; B21C 23/218; B21C 23/22; B21C 25/02; B21C 25/06; B21C 33/002; B21C 33/004; B21C 33/006
See application file for complete search history.

(56) References Cited

U.S. PATENT DOCUMENTS

| | | |
|---|---|---|
| 3,661,726 A | 5/1972 | Denes |
| 3,684,593 A | 8/1972 | Benz et al. |
| 3,884,062 A | 5/1975 | Green |
| 3,892,603 A | 7/1975 | Reid |
| 3,933,536 A | 1/1976 | Doser et al. |
| 3,977,918 A | 8/1976 | Paladino et al. |
| 3,989,548 A | 11/1976 | Morris |
| 4,287,749 A | 9/1981 | Bachrach et al. |
| 4,300,378 A | 11/1981 | Thiruvarudchelvan |
| 4,431,467 A | 2/1984 | Staley et al. |
| 4,585,473 A | 4/1986 | Narasimhan et al. |
| 4,778,542 A | 10/1988 | Clemens |
| 4,801,340 A | 1/1989 | Inoue et al. |
| 4,808,224 A | 2/1989 | Anderson et al. |
| 4,892,596 A | 1/1990 | Chatterjee |
| 4,985,085 A | 1/1991 | Chatterjee |
| 5,026,438 A | 6/1991 | Young et al. |
| 5,089,060 A | 2/1992 | Bradley et al. |
| 5,226,989 A | 7/1993 | Sukonnik |
| 5,242,508 A | 9/1993 | McCallum et al. |
| 5,262,123 A | 11/1993 | Thomas et al. |
| 5,283,130 A | 2/1994 | Bradley et al. |
| 5,437,545 A | 8/1995 | Hirai |
| 5,461,898 A | 10/1995 | Lessen |
| 5,470,401 A | 11/1995 | McCallum et al. |
| 5,492,264 A | 2/1996 | Wadleigh |
| 5,737,959 A | 4/1998 | Korbel et al. |
| 5,739,498 A | 4/1998 | Sunamoto et al. |
| 5,964,117 A | 10/1999 | Holroyd et al. |
| 5,988,484 A | 11/1999 | Osborn et al. |
| 6,022,424 A | 2/2000 | Sellers et al. |
| 6,036,467 A | 3/2000 | Jameson |
| 6,638,462 B2 | 10/2003 | Davidson et al. |
| 6,843,405 B2 | 1/2005 | Okamoto et al. |
| 6,940,379 B2 | 9/2005 | Creighton |
| 7,096,705 B2 | 8/2006 | Segal |
| 7,314,670 B2 | 1/2008 | Bartsch et al. |
| 7,322,508 B2 | 1/2008 | Chang |
| 7,954,692 B2 | 6/2011 | Fukuda |
| 8,016,179 B2 | 9/2011 | Burford |
| 8,240,540 B2 | 8/2012 | Tanaka et al. |
| 8,313,692 B2 | 11/2012 | Somekawa et al. |
| 8,695,868 B2 | 4/2014 | Messer et al. |
| 10,189,063 B2 | 1/2019 | Lavender et al. |
| 10,369,748 B2 | 8/2019 | Whalen et al. |
| 10,695,811 B2 | 6/2020 | Joshi et al. |
| 10,987,754 B1 | 4/2021 | Eller et al. |
| 11,045,851 B2 | 6/2021 | Joshi et al. |
| 2002/0029601 A1 | 3/2002 | Kwok |
| 2004/0057782 A1 | 3/2004 | Okamoto et al. |
| 2004/0238501 A1 | 12/2004 | Kawazoe et al. |
| 2004/0265503 A1 | 12/2004 | Clayton et al. |
| 2005/0081594 A1 | 4/2005 | Segal |
| 2006/0005898 A1 | 1/2006 | Lui et al. |
| 2006/0027628 A1 | 2/2006 | Sutherlin et al. |
| 2008/0029581 A1 | 2/2008 | Kumagai et al. |
| 2008/0048005 A1 | 2/2008 | Forrest et al. |
| 2008/0202653 A1 | 8/2008 | Ignberg |
| 2008/0251571 A1 | 10/2008 | Burford |
| 2009/0072007 A1 | 3/2009 | Nagano |
| 2009/0269605 A1 | 10/2009 | Warke et al. |
| 2009/0291322 A1 | 11/2009 | Watanabe et al. |
| 2010/0059151 A1 | 3/2010 | Iwamura et al. |
| 2010/0089976 A1 | 4/2010 | Szymanski et al. |
| 2010/0132430 A1 | 6/2010 | Tsai et al. |
| 2011/0104515 A1 | 5/2011 | Kou et al. |
| 2011/0132970 A1 | 6/2011 | Nakagawa et al. |
| 2011/0309131 A1 | 12/2011 | Hovanski et al. |
| 2012/0006086 A1 | 1/2012 | Manchiraju et al. |
| 2012/0052322 A1 | 3/2012 | Hatakeyama et al. |
| 2012/0168045 A1 | 7/2012 | Ihara et al. |
| 2012/0223451 A1 | 9/2012 | Hulseman et al. |
| 2012/0258332 A1 | 10/2012 | Hatakeyama et al. |
| 2013/0075452 A1 | 3/2013 | Burford |
| 2013/0266467 A1 | 10/2013 | Manchiraju et al. |
| 2014/0000332 A1 | 1/2014 | Wilson et al. |
| 2014/0002220 A1 | 1/2014 | Johnson et al. |
| 2014/0076957 A1 | 3/2014 | Sayama et al. |
| 2014/0102159 A1 | 4/2014 | Denison |
| 2014/0102161 A1 | 4/2014 | Stewart |
| 2014/0248508 A1 | 9/2014 | Ohhama et al. |
| 2014/0260489 A1 | 9/2014 | Funk et al. |
| 2014/0283574 A1 | 9/2014 | Lavender et al. |
| 2014/0291886 A1 | 10/2014 | Mark et al. |
| 2014/0328710 A1 | 11/2014 | Cui et al. |
| 2015/0075242 A1 | 3/2015 | Eller et al. |
| 2015/0115019 A1 | 4/2015 | Pascal et al. |
| 2015/0360317 A1 | 12/2015 | Kalvala et al. |
| 2016/0008918 A1 | 1/2016 | Burford |
| 2016/0151817 A1 | 6/2016 | Nayfeh et al. |
| 2016/0151818 A1 | 6/2016 | Shao |
| 2016/0167353 A1 | 6/2016 | Fan et al. |
| 2016/0175981 A1 | 6/2016 | Kandasamy |
| 2016/0175982 A1 | 6/2016 | Kandasamy et al. |
| 2016/0184922 A1 | 6/2016 | Kikyo |
| 2016/0228932 A1 | 8/2016 | Hayashi et al. |
| 2016/0354860 A1 | 12/2016 | Boettcher et al. |
| 2017/0008121 A1 | 1/2017 | Li |
| 2017/0056947 A1 | 3/2017 | Lavender et al. |
| 2017/0136686 A1 | 5/2017 | Ueno et al. |
| 2017/0163135 A1 | 6/2017 | Emberton et al. |
| 2017/0182587 A1 | 6/2017 | Tokoro et al. |
| 2017/0216961 A1 | 8/2017 | Utter et al. |

(56) References Cited

U.S. PATENT DOCUMENTS

| | | | |
|---|---|---|---|
| 2017/0225265 | A1 | 8/2017 | Ito et al. |
| 2017/0304933 | A1 | 10/2017 | Miles et al. |
| 2017/0355003 | A1 | 12/2017 | TenHouten et al. |
| 2018/0036840 | A1 | 2/2018 | Hu et al. |
| 2018/0043467 | A1 | 2/2018 | Huysmans |
| 2018/0050419 | A1 | 2/2018 | Das et al. |
| 2018/0311713 | A1 | 11/2018 | Joshi et al. |
| 2018/0354231 | A1 | 12/2018 | Iwase |
| 2018/0369889 | A1 | 12/2018 | Zhang et al. |
| 2019/0267153 | A1 | 8/2019 | Kappagantula et al. |
| 2019/0275608 | A1 | 9/2019 | Das et al. |
| 2021/0053100 | A1 | 2/2021 | Whalen et al. |
| 2021/0086291 | A1 | 3/2021 | Okada et al. |
| 2021/0197241 | A1 | 7/2021 | Grant et al. |
| 2021/0205918 | A1 | 7/2021 | Fujii et al. |
| 2021/0252632 | A1 | 8/2021 | Eller et al. |
| 2021/0402471 | A1 | 12/2021 | Whalen et al. |
| 2022/0297174 | A1 | 9/2022 | Whalen et al. |
| 2023/0042802 | A1 | 2/2023 | Whalen et al. |
| 2023/0088412 | A1 | 3/2023 | Joshi et al. |
| 2023/0150022 | A1 | 5/2023 | Whalen et al. |
| 2023/0234115 | A1 | 7/2023 | Kappagantula et al. |

FOREIGN PATENT DOCUMENTS

| | | | |
|---|---|---|---|
| CN | 105925846 B | * | 2/2018 |
| CN | 109295332 B | | 4/2020 |
| CN | 112512710 B | | 10/2023 |
| EP | 2990178 | | 8/2014 |
| EP | 2777837 A1 | | 9/2014 |
| EP | 3817872 | | 2/2025 |
| GB | 1258141 | | 12/1971 |
| JP | 2002361320 | | 12/2002 |
| JP | 2003-275876 | | 9/2003 |
| JP | 2004174563 A | | 6/2004 |
| JP | 2007-222925 | | 9/2007 |
| JP | 2009090359 A | | 4/2009 |
| JP | 2019115909 A | | 7/2019 |
| KR | 101316989 B1 | | 10/2013 |
| WO | 2019040730 | | 2/2019 |
| WO | 2020010331 | | 1/2020 |
| WO | 2020053168 | | 3/2020 |
| WO | WO PCT/US2019/040730 | | 1/2021 |
| WO | WO-2021062415 A1 | | 4/2021 |
| WO | WO PCT/US2021/050022 | | 2/2022 |
| WO | 2022043532 | | 3/2022 |
| WO | 2022056358 | | 3/2022 |
| WO | WO PCT/US2020/053168 | | 4/2022 |
| WO | WO PCT/US22/43532 | | 1/2023 |
| WO | 2023015228 | | 2/2023 |
| WO | WO PCT/US2023/015228 | | 6/2023 |
| WO | WO-2023177693 A1 | | 9/2023 |

OTHER PUBLICATIONS

Abu-Farha, "A Preliminary Study on the Feasibility of Friction Stir Back Extrusion", Scripta Materials, 66, 2012, United States, 615-618.

Amancio-Filho et al., "Joining of Polymers and Polymer-Metal Hybrid Structures: Recent Developments and Trends", Polymer Engineering & Science, 2009, United States, pp. 1461-1476.

Bozzi et al., "Intermetallic Compounds in Al 6016/IF-Steel Friction Stir Spot Welds", Materials Science and Engineering, 2010, Netherlands, pp. 4505-4509.

Cole et al., "Lightweight materials for Automotive Applications", Materials Characterization, 35, 1995, United States, pp. 3-9.

Evans et al., "Friction Stir Extrusion: A new process for joining dissimilar materials", Manufacturing Letters, 5, 2015, United States, pp. 25-28.

Gann, J.A., "Magnesium Industry's Lightest Structural Metal", SAE Transactions, vol. 25-26, 1930-1931, United States, pp. 620-634, 641.

Hammond et al., "Equal-Channel Angular Extrusion of a Low-Density High-Entropy Alloy Produced by High-Energy Cryogenic Mechanical Alloying", JOM. vol. 66, No. 10, United States, 2014, pp. 2021-2029.

Kaiser et al., "Anisotropic Properties of Magnesium Sheet AZ31", Materials Science Forum, vols. 419-422, Switzerland, 2003, pp. 315-320.

Kuo et al., "Fabrication of High Performance Magnesium/Carbon-Fiber/PEEK/Laminated Composites", Materials Transactions, vol. 44, No. 8 (2003), Japan, pp. 1613-1619.

Leitao et al., "Aluminum-steel lap joining by multipass friction stir welding", Materials and Design, 106, 2016, United States, pp. 153-160.

Liu et al., "A Review of Dissimilar Welding Techniques for Magnesium Alloys to Aluminum Alloys", Materials, 7, 2014, United States, pp. 3735-3757.

Liu et al., "Microstructure and mechanical properties of equimolar FeCoCrNi high entropy alloy prepared via powder extrusion", Intermetallics 75 (2016), United States, pp. 25-30.

Luo, Alan, "Magnesium: Current and Potential Automotive Applications", JOM, 54(2), 2002, United States, pp. 42-48.

Martinsen et al., "Joining of Dissimilar Materials", CIRP Annals—Manufacturing Technology, 2015, United States, 21 pages.

Nakamura et al., "Tool Temperature and Process Modeling of Friction Stir Welding", (2018) Modern Mechanical Engineering, 8, 78-94.

Office Action for U.S. Appl. No. 14/222,468, filed Mar. 21, 2014, First named inventor Curtis A. Lavender, Notification date Nov. 6, 2015, 10 pages.

Office Action for U.S. Appl. No. 14/222,468, filed Mar. 21, 2014, First named inventor Curtis A. Lavender, Notification date Apr. 1, 2016, 10 pages.

Office Action for U.S. Appl. No. 14/222,468, filed Mar. 21, 2014, First named inventor Curtis A. Lavender, Notification date May 20, 2016, 3 pages.

Office Action for U.S. Appl. No. 14/222,468, filed Mar. 21, 2014, First named inventor Curtis A. Lavender, Notification date Jan. 26, 2017, 9 pages.

Office Action for U.S. Appl. No. 14/268,220, filed May 2, 2014, First Named Inventor Jun Cui, Notification date Dec. 1, 2015, 7 pages.

Pickens, "Aluminum Powder Metallurgy Technology for High-Strength Applications", Journal of Materials Science 16 (1981) 1437-1457, United Kingdom, 21 pages.

Rodewald et al. "Top Nd-Fe-B Magnets with Greater Than 56 MGOe Energy Density and 9.8 kOe Coercivity", IEEE Transactions on Magnetics, vol. 38, No. 5, 2002, United States, pp. 2955-2957.

Saha, "Aluminum Extrusion Technology, Chapter 1, Fundamentals of Extrusion", The Materials Information Society, ASM International, 2000, United States, pp. 1-29.

Thomasnet.com, https:/www.thomasnet.com/articles/custom-manufacturing-fabricating/friction-stir-welding/ Feb. 10, 2011 (Year: 2011).

Trang et al., "Designing a Magnesium Alloy with High Strength and High Formability", Nature Communications, 2018, United Kingdom, 6 pages.

Whalen et al., "High Ductility Aluminum Alloy Made from Powder by Friction Extrusion", Materalia 6 (2019) 100260, Netherlands, 6 pages.

Whalen et al., U.S. Appl. No. 15/694,565, filed Sep. 1, 2017, titled "System and Process for Joining Dissimilar Materials and Solid-State Interocking Joint with Intermetallic Interface Formed Thereby", 69 pages.

Zhang et al., "Numerical Studies on Effect of Axial Pressure in Friction Stir Welding", (2007) Science and Technology of Welding and Joining, vol. 12, No. 3, United Kingdom, pp. 226-248.

U.S. Appl. No. 14/222,468, filed Mar. 21, 2014, System and Process for Formation of Extrusion Structures.

(56) References Cited

OTHER PUBLICATIONS

U.S. Appl. No. 15/351,201 U.S. Pat. No. 10,189,063, filed Nov. 14, 2016, System and Process for Formation of Extrusion Products.
U.S. Appl. No. 62/460,227, filed Feb. 17, 2017, Functionally Graded Coatings and Claddings.
U.S. Appl. No. 16/916,548 U.S. Pat. No. 11,517,952, filed Jun. 30, 2020, Shear Assited Extrusion Process.
U.S. Appl. No. 15/898,515 U.S. Pat. No. 10,695,811, filed Feb. 17, 2018, Fuctionally Graded Coatings and Claddings.
U.S. Appl. No. 17/984,144, filed Nov. 9, 2022, Functionally Graded Coatings and Claddings.
U.S. Appl. No. 16/028,173 U.S. Pat. No. 11,045,851, filed Jul. 5, 2018, Method for Forming Hollow Profile Non-Circular Extrusions Using Shear Assisted Processing and Extrusion (SHAPE).
U.S. Appl. No. 17/175,464 U.S. Pat. No. 11,534,811, filed Feb. 12, 2021, Method for Forming Hollow Profile Non-Circular Extrusions Using Shear Assisted Processing and Extrusion (SHAPE).
U.S. Appl. No. 16/562,314 U.S. Pat. No. 11,383,280, filed Sep. 5, 2019, Devices and Methods for Performing Shear-Assisted Extrusion, Extrusion Feedstocks, Extrusion Processes, and Methods for Preparing Metal Sheets.
U.S. Appl. No. 17/826,054, filed May 26, 2022, Devices and Methods for Performing Shear-Assisted Extrusion, Extrusion Feedstocks, Extrusion Processes, and Methods for Preparing Metal Sheets.
U.S. Appl. No. 17/665,433 U.S. Pat. No. 11,684,959, filed Feb. 4, 2022, Extusion Processes for Forming Extrusions of a Desired Composition From a Feedstock.
U.S. Appl. No. 17/033,854, filed Sep. 27, 2020, Devices and Methods for Performing Shear-Assisted Extrusion and Extrusion Processes.
U.S. Appl. No. 17/874,140, filed Jul. 26, 2022, Devices and Methods for Performing Shear-Assisted Extrusion and Extrusion Processes.
U.S. Appl. No. 17/035,597, filed Sep. 28, 2020, Shape Processes, Feedstock Materials, Conductive Materials and/or Assembiles.
U.S. Appl. No. 17/242,166, filed Apr. 27, 2021, Devices and Methods for Performing Shear-Assisted Extrusion and Extrusion Processes.
U.S. Appl. No. 17/957,207, filed Sep. 30, 2022, Devices and Methods for Performing Shear-Assisted Extrusion and Extrusion Processes.
U.S. Appl. No. 17/473,178, filed Sep. 13, 2021, Devices and Methods for Performing Shear-Assisted Extrusion and Extrusion Processes.
U.S. Appl. No. 18/093,636, filed Jan. 5, 2023, Devices and Methods for Performing Shear-Assisted Extrusion and Extrusion Processes.
U.S. Appl. No. 18/121,563, filed Mar. 14, 2023, Extrusion Prcesses, Feedstock Materials, Conductive Materials and/or Assemblies.
"U.S. Appl. No. 17/033,854, Final Office Action mailed Jun. 7, 2023", 11 pgs.
"U.S. Appl. No. 17/035,597, Final Office Action mailed May 10, 2023", 13 pgs.
"U.S. Appl. No. 17/473,178, Non Final Office Action mailed Feb. 8, 2023", 22 pgs.
"U.S. Appl. No. 17/826,054, Preliminary Amendment filed Jul. 13, 2023", 9 pgs.
"International Application Serial No. PCT US2019 040730, International Preliminary Report on Patentability mailed Jan. 5, 2021", (Jan. 5, 2021), 8 pages.
"International Application Serial No. PCT US2019 040730, International Search Report mailed Oct. 21, 2019", (Oct. 21, 2019), 4 pages.
"International Application Serial No. PCT US2019 040730, Written Opinion mailed Oct. 21, 2019", (Oct. 21, 2019), 7 pages.
"International Application Serial No. PCT US2021 050022, International Preliminary Report on Patentability mailed Dec. 1, 2022", 18 pgs.
"U.S. Appl. No. 17/033,854, Response filed Aug. 7, 2023 to Final Office Action mailed Jun. 7, 2023", 9 pgs.
"U.S. Appl. No. 17/033,854, Advisory Action mailed Aug. 16, 2023", 4 pgs.
"U.S. Appl. No. 17/035,597, Non Final Office Action mailed Aug. 28, 2023", 10 pgs.
"U.S. Appl. No. 17/242,166, Final Office Action mailed Aug. 30, 2023", 7 pgs.
"European Application Serial No. 19745460.6, Response filed Sep. 18, 2023 to Communication Pursuant to Article 94(3) EPC mailed May 10, 2023", 9 pgs.
"European Application Serial No. 19745460.6, Communication Pursuant to Article 94(3) EPC mailed May 10, 2023", 6 pgs.
"CN 201980045070X Office Action mailed Sep. 6, 2022", with English translation, 13 pages.
"CN 201980045070X Response mailed Apr. 11, 2023 to Office Action Sep. 6, 2022", with English claims, 8 pages.
"U.S. Appl. No. 17/033,854, Notice of Allowance mailed Sep. 20, 2024", 16 pgs.
"U.S. Appl. No. 17/874,140, Response filed Sep. 16, 2024 to Non Final Office Action mailed Mar. 20, 2024", 15 pgs.
"U.S. Appl. No. 17/984,144, Response filed Sep. 17, 2024 to Non Final Office Action mailed Mar. 29, 2024", 8 pgs.
"Canadian Application Serial No. 3,155,420, Response filed Aug. 13, 2024 to Examiners Rule 862 Requisition Report Apr. 18, 2024", 10 pgs.
"Application Serial No. PCT US2023 015228, IPRP mailed Sep. 26, 2024", 11 pgs.
"U.S. Appl. No. 17/957,207, Response filed Oct. 14, 2024 to Final Office Action mailed Jun. 12, 2024", 14 pgs.
"U.S. Appl. No. 17/473,178, Response filed Oct. 14, 2024 to Final Office Action mailed Jun. 14, 2024", 14 pgs.
"U.S. Appl. No. 18/093,636, Response filed Oct. 14, 2024 to Non Final Office Action mailed Jun. 14, 2024", 14 pgs.
"U.S. Appl. No. 17/473,178, Examiner Interview Summary mailed Oct. 16, 2024", 3 pgs.
"U.S. Appl. No. 17/826,054, Final Office Action mailed Oct. 18, 2024", 14 pgs.
"U.S. Appl. No. 17/957,207, Response filed Nov. 8, 2024 to Advisory Action mailed Oct. 31, 2024 and Final Office Action mailed Jun. 12, 2024", 16 pgs.
"U.S. Appl. No. 17/957,207, Advisory Action mailed Oct. 31, 2024", 3 pgs.
"U.S. Appl. No. 17/473,178, Advisory Action mailed Oct. 31, 2024", 3 pgs.
"U.S. Appl. No. 17/473,178, Response filed Nov. 8, 2024 to Advisory Action mailed Oct. 31, 2024 and Final Office Action Jun. 14, 2024", 14 pgs.
"U.S. Appl. No. 17/033,854, Advisory Action mailed Jun. 5, 2024", 4 pgs.
"U.S. Appl. No. 17/033,854, Examiner Interview Summary mailed Jul. 30, 2024", 3 pgs.
"U.S. Appl. No. 17/033,854, Final Office Action mailed Mar. 28, 2024", 12 pgs.
"U.S. Appl. No. 17/033,854, Non Final Office Action mailed Oct. 4, 2023", 11 pgs.
"U.S. Appl. No. 17/033,854, Response filed Mar. 7, 2024 to Non Final Office Action mailed Oct. 4, 2023", 10 pgs.
"U.S. Appl. No. 17/033,854, Response filed May 28, 2024 to Final Office Action mailed Mar. 28, 2024", 13 pgs.
"U.S. Appl. No. 17/033,854, Response filed Aug. 23, 2024 to Advisory Action mailed Jun. 5, 2024", 17 pgs.
"U.S. Appl. No. 17/035,597, Examiner Interview Summary mailed Aug. 22, 2024", 3 pgs.
"U.S. Appl. No. 17/035,597, Final Office Action mailed Apr. 17, 2024", 23 pgs.
"U.S. Appl. No. 17/035,597, Non Final Office Action mailed Sep. 6, 2024", 19 pgs.
"U.S. Appl. No. 17/035,597, Response filed Feb. 28, 2024 to Non Final Office Action mailed Aug. 28, 2023", 10 pgs.
"U.S. Appl. No. 17/035,597, Response filed Aug. 19, 2024 to Final Office Action mailed Apr. 17, 2024", 17 pgs.
"U.S. Appl. No. 17/035,597, Response filed Sep. 11, 2023 to Non Final Office Action mailed Aug. 28, 2023", 61 pgs.

(56) References Cited

OTHER PUBLICATIONS

"U.S. Appl. No. 17/473,178, Advisory Action mailed Jan. 3, 2024", 3 pgs.
"U.S. Appl. No. 17/473,178, Final Office Action mailed Jun. 14, 2024", 21 pgs.
"U.S. Appl. No. 17/473,178, Final Office Action mailed Oct. 20, 2023", 9 pgs.
"U.S. Appl. No. 17/473,178, Non Final Office Action mailed Jan. 3, 2024", 10 pgs.
"U.S. Appl. No. 17/473,178, Non Final Office Action mailed Feb. 28, 2024", 19 pgs.
"U.S. Appl. No. 17/473,178, Response filed Apr. 11, 2024 to Non Final Office Action mailed Jan. 3, 2024", 8 pgs.
"U.S. Appl. No. 17/473,178, Response filed May 28, 2024 to Non Final Office Action mailed Feb. 28, 2024", 10 pgs.
"U.S. Appl. No. 17/473,178, Response filed Jul. 10, 2023 to Non Final Office Action mailed Feb. 8, 2023", 13 pgs.
"U.S. Appl. No. 17/473,178, Response filed Dec. 20, 2023 to Final Office Action mailed Oct. 20, 2023", 11 pgs.
"U.S. Appl. No. 17/826,054, Examiner Interview Summary mailed Jul. 30, 2024", 3 pgs.
"U.S. Appl. No. 17/826,054, Non Final Office Action mailed Mar. 8, 2024", 13 pgs.
"U.S. Appl. No. 17/826,054, Response filed Aug. 8, 2024 to Non Final Office Action mailed Mar. 8, 2024", 13 pgs.
"U.S. Appl. No. 17/874,140, Non Final Office Action mailed Mar. 20, 2024", 10 pgs.
"U.S. Appl. No. 17/957,207, Final Office Action mailed Jun. 12, 2024", 13 pgs.
"U.S. Appl. No. 17/984,144, Non Final Office Action mailed Mar. 29, 2024", 14 pgs.
"U.S. Appl. No. 18/093,636, Non Final Office Action mailed Jun. 14, 2024", 14 pgs.
"U.S. Appl. No. 18/093,636, Response filed Apr. 5, 2024 to Restriction Requirement mailed Dec. 20, 2023", 6 pgs.
"U.S. Appl. No. 18/093,636, Restriction Requirement mailed Dec. 20, 2023", 6 pgs.
"U.S. Appl. No. PCT/US2023/015228, Written Opinion mailed Jun. 15, 2023", 6 pgs.
"Canadian Application No. 3155420, Examiners Rule 862 Requisition Report Consolidated Correspondence Jul. 20, 2023", 5 pgs.
"Canadian Application No. 3155420, Examiners Rule mailed May 11, 2023", 4 pgs.
"Canadian Application Serial No. 3,105,375 Examiners Rule 86 2 Requisition mailed Dec. 28, 2023", 7 pgs.
"Canadian Application Serial No. 3,105,375, Response filed Apr. 26, 2024 to Examiners Rule 862 Requisition mailed Dec. 28, 2023", 27 pgs.
"Canadian Application Serial No. 3,155,420, Examiners Rule 862 Requisition Report Apr. 18, 2024", 3 pgs.
"Canadian Application Serial No. 3,192,375, Voluntary Amendment filed Dec. 28, 2023", 59 pgs.
"Chinese Application Serial No. 202180062766.0, Voluntary Amendment filed Nov. 13, 2023", with English claims, 91 pages.
"Chinese Application Serial No. 202311192831.9, Response filed Dec. 28, 2023 to Notification to Make Rectification issued Nov. 1, 2023", with English claims, 21 pages.
"European Application Serial No. 19745460.6, Response filed Jun. 20, 2024 to Summons to attend oral proceedings pursuant to Rule 115(1) EPC mailed Jan. 4, 2024", 12 pgs.
"European Application Serial No. 19745460.6, Summons to attend oral proceedings pursuant to Rule 115(1) EPC mailed Jan. 4, 2024", 6 pgs.
"European Application Serial No. 20869757, Extended European Search Report mailed Sep. 19, 2023", 10 pgs.
"European Application Serial No. 20869757, Response filed Apr. 12, 2024 to Extended European Search Report mailed Sep. 19, 2023", 13 pgs.
"European Application Serial No. 20869757.3, Communication Pursuant to Article 94(3) EPC mailed Sep. 4, 2024", 6 pgs.
"European Application Serial No. 21867741.7, Extended European Search Report mailed Aug. 12, 2024", 8 pgs.
"European Application Serial No. 21867741.7, Response to Communication Pursuant to Rules 161 & 162 EPC filed Oct. 16, 2023", 15 pgs.
"International Application Serial No. PCT/US2020/05168 International Search Report mailed Feb. 8, 2021", 5 pgs.
"International Application Serial No. PCT/US2020/05168 Written Opinion mailed Feb. 8, 2021", 6 pgs.
"International Application Serial No. PCT/US2020/053168, International Preliminary Report on Patentability mailed Apr. 7, 2022", 8 pgs.
"International Application Serial No. PCT/US2021/050022, International Preliminary Report on Patentability mailed Dec. 1, 2022", 17 pgs.
"International Application Serial No. PCT/US2021/050022, International Search Report mailed Feb. 3, 2022", 5 pgs.
"International Application Serial No. PCT/US2021/050022, Written Opinion mailed Feb. 3, 2022", 6 pgs.
"International Application Serial No. PCT/US2023/015228, International Search Report mailed Jun. 15, 2023", 5 pgs.
"JP 2004-174563 Translation from FIT database", (Year: 2024), 22 pgs.
Tang, W., "Production of wire via friction extrusion of aluminum alloy machining chips", Journal of Materials Processing Technology vol. 210 Issue 15, (Nov. 19, 2010), 7 pages.
"U.S. Appl. No. 17/826,054, Response filed Jan. 6, 2025 to Final Office Action mailed Oct. 18, 2024", 9 pgs.
"European Application Serial No. 20869757.3, Response filed Jan. 3, 2025 to Communication Pursuant to Article 94(3) EPC mailed Sep. 4, 2024", 10 pgs.
"U.S. Appl. No. 18/093,636, Final Office Action mailed Jan. 13, 2025", 12 pgs.
"JP-2002361320-A Translation provided by FIT database", Retrieved from Patent Center, (Year: 2025), 8 pages.
"U.S. Appl. No. 17/035,597, Response filed Feb. 6, 2025 to Non Final Office Action mailed Sep. 6, 2024", 8 pgs.
"U.S. Appl. No. 17/826,054, Notice of Allowance mailed Feb. 26, 2025", 10 pgs.
"Canadian Application Serial No. 3,105,375, Response filed Mar. 3, 2025 to Examiners Rule 86(2) Report mailed Nov. 6, 2024", 7 pgs.
"European Application Serial No. 25156776.4, Response filed Mar. 20, 2025 to Invitation to Remedy Deficiencies (R. 58 EPC) mailed Feb. 20, 2025", 8 pgs.
"Canadian Application Serial No. 3,105,375, Examiners Rule 86(2) Report mailed Nov. 6, 2024", 9 pages.
"U.S. Appl. No. 17/874,140, Final Office Action mailed Nov. 15, 2024", 11 pages.
"U.S. Appl. No. 17/957,207, Notice of Allowance mailed Nov. 22, 2024", 9 pages.
"U.S. Appl. No. 17/473,178, Notice of Allowance mailed Nov. 25, 2024", 8 pages.
"U.S. Appl. No. 17/984,144, Notice of Allowance mailed Nov. 26, 2024", 11 pages.
"U.S. Appl. No. 17/984,144, Notice of Allowance mailed Mar. 27, 2025", 11 pgs.
"U.S. Appl. No. 17/473,178, Notice of Allowance mailed Mar. 28, 2025", 12 pgs.
"U.S. Appl. No. 18/093,636, Response filed Apr. 14, 2025 to Final Office Action mailed Jan. 13, 2025", 9 pgs.
"U.S. Appl. No. 17/874,140, Response filed Apr. 15, 2025 to Final Office Action mailed Nov. 15, 2024", 8 pgs.
"U.S. Appl. No. 17/035,597, Notice of Allowance mailed May 7, 2025", 12 pgs.
"European Application Serial No. 23771340.9, Response to Communication pursuant to Rules 161 and 162 EPC filed Apr. 22, 2025", 10 pgs.
"Canadian Application Serial No. 3,192,375 Requisition By the Examiner in Accordance With Subsection 86(2) mailed May 27, 2025", 8 pages.
"U.S. Appl. No. 17/874,140, Non Final Office Action mailed Jun. 12, 2025", 15 pages.

(56) References Cited

OTHER PUBLICATIONS

"A Translation from FIT database", JP 2002361320, (Year: 2025), 8 pages.
"U.S. Appl. No. 18/093,636, Non Final Office Action mailed Jun. 17, 2025", 11 pages.

* cited by examiner

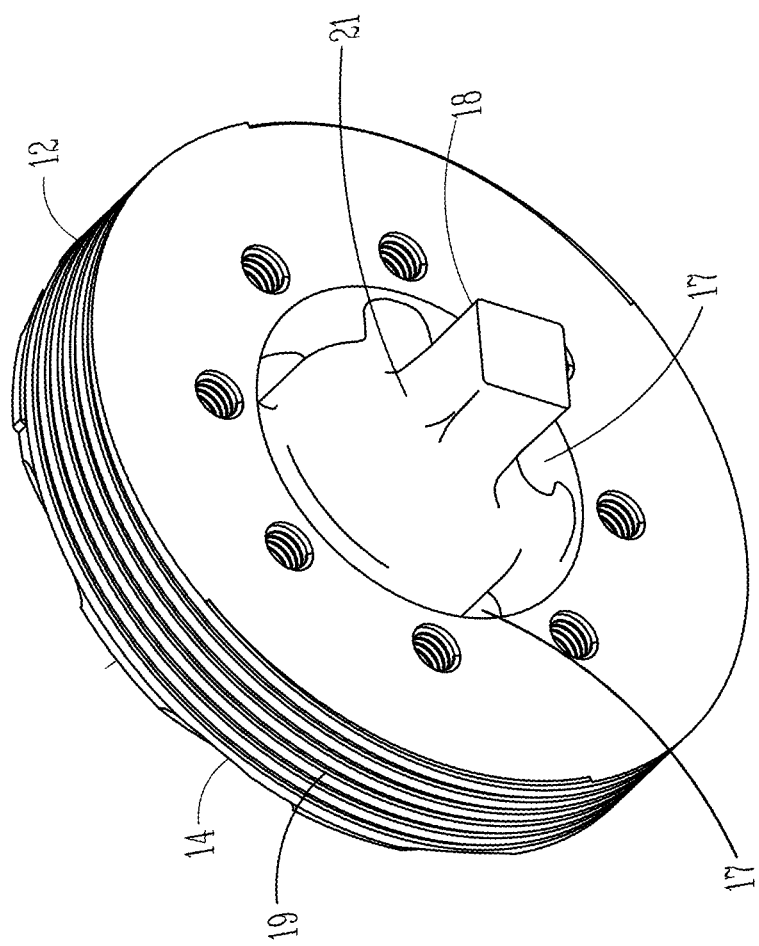

METHOD FOR FORMING HOLLOW PROFILE NON-CIRCULAR EXTRUSIONS USING SHEAR ASSISTED PROCESSING AND EXTRUSION (ShAPE)

PRIORITY

This application is a continuation of U.S. patent application Ser. No. 17/175,464 filed Feb. 12, 2021, which is a divisional of U.S. patent application Ser. No. 16/028,173 filed Jul. 5, 2018, now U.S. Pat. No. 11,045,851 issued Jun. 29, 2021, which is a Continuation-In-Part of and claims priority to U.S. patent application Ser. No. 15/898,515 filed Feb. 17, 2018, now U.S. Pat. No. 10,695,811 issued Jun. 30, 2020, which is a Continuation-in-Part and claims priority and the benefit of both U.S. Provisional Application Ser. No. 62/460,227 filed Feb. 17, 2017 and U.S. patent application Ser. No. 15/351,201 filed Nov. 14, 2016, now U.S. Pat. No. 10,189,063 issued Jan. 29, 2019, which is a Continuation-in-Part and claims priority and the benefit of both U.S. Provisional Application Ser. No. 62/313,500 filed Mar. 25, 2016 and U.S. patent application Ser. No. 14/222,468 filed Mar. 21, 2014, which claims priority to and the benefit of U.S. Provisional Application Ser. No. 61/804,560 filed Mar. 22, 2013; the contents of each of which are hereby incorporated by reference.

STATEMENT AS TO RIGHTS TO INVENTIONS MADE UNDER FEDERALLY-SPONSORED RESEARCH AND DEVELOPMENT

This invention was made with Government support under Contract DE-AC0576RL01830 awarded by the U.S. Department of Energy. The Government has certain rights in the invention.

BACKGROUND

Increased needs for fuel efficiency in transportation coupled with ever increasing needs for safety and regulatory compliance have focused attention on the development and utilization of new materials and processes. In many instances, impediments to entry into these areas has been caused by the lack of effective and efficient manufacturing methods. For example, the ability to replace steel car parts with materials made from magnesium or aluminum or their associated alloys is of great interest. Additionally, the ability to form hollow parts with equal or greater strength than solid parts is an additional desired end. Previous attempts have failed or are subject to limitations based upon a variety of factors, including the lack of suitable manufacturing process, the expense of using rare earths in alloys to impart desired characteristics, and the high energy costs for production.

What is needed is a process and device that enables the production of items such components in automobile or aerospace vehicles with hollow cross sections that are made from materials such as magnesium or aluminum with or without the inclusion of rare earth metals. What is also need is a process and system for production of such items that is more energy efficient, capable of simpler implementation, and produces a material having desired, grain sizes, structure and alignment so as to preserve strength and provide sufficient corrosion resistance. What is also needed is a simplified process that enables the formation of such structures directly from billets, powders or flakes of material without the need for additional processing steps. What is also needed is a new method for forming high entropy alloy materials that is simpler and more effective than current processes. The present disclosure provides a description of significant advance in meeting these needs.

Over the past several years researchers at the Pacific Northwest National Laboratory have developed a novel Shear Assisted Processing and Extrusion (ShAPE) technique which uses a rotating ram or die rather than a simply axially fed ram or die used in the conventional extrusion process. As described here after as well as in the in the previously cited, referenced, and incorporated patent applications, this process and its associated devices provide a number of significant advantages including reduced power consumption, better results and enables a whole new set of "solid phase" types of forming process and machinery. Deployment of the advantages of these processes and devices are envisioned in a variety of industries and applications including but not limited to transportation, projectiles, high temperature applications, structural applications, nuclear applications, and corrosion resistance applications.

Various additional advantages and novel features of the present invention are described herein and will become further readily apparent to those skilled in this art from the following detailed description. In the preceding and following descriptions we have shown and described only the preferred embodiment of the invention, by way of illustration of the best mode contemplated for carrying out the invention. As will be realized, the invention is capable of modification in various respects without departing from the invention. Accordingly, the drawings and description of the preferred embodiment set forth hereafter are to be regarded as illustrative in nature, and not as restrictive.

SUMMARY

The present description provides examples of shear-assisted extrusion processes for forming non-circular hollow-profile extrusions of a desired composition from feedstock material. At a high-level this is accomplished by simultaneously applying a rotational shearing force and an axial extrusion force to the same location on the feedstock material using a scroll face with a plurality of grooves defined therein. These grooves are configured to direct plasticized material from a first location, typically on the interface between the material and the scroll face, through a portal defined within the scroll face to a second location, typically upon a die bearing surface. At this location the separated streams of plasticized material are recombined and reconfigured into a desired shape having the preselected characteristics.

In some applications the scroll face has multiple portals, each portal configured to direct plasticized material through the scroll face and to recombine at a desired location either unified or separate. In the particular application described the scroll face has two sets of grooves one set to direct material from the outside in and another configured to direct material from the inside out. In some instances a third set of grooves circumvolves the scroll face to contain the material and prevent outward flashing.

This processes provides a number of advantages including the ability to form materials with better strength and corrosion resistance characteristics at lower temperatures, lower forces, and with significantly lower energy intensity than required by other processes.

For example in on instance the extrusion of the plasticized material is performed at a die face temperature less than 150° C. In other instances the axial extrusion force is at or below 50 MPa. In one particular instance a magnesium alloy in billet form was extruded into a desired form in an arrangement wherein the axial extrusion force is at or below 25 MPa, and the temperature is less than 100° C. While these examples are provided for illustrative reasons, it is to be distinctly understood that the present description also contemplates a variety of alternative configurations and alternative embodiments.

Another advantage of the presently disclosed embodiment is the ability to produce high quality extruded materials from a wide variety of starting materials including, billets, flakes powders, etc. without the need for additional pre or post processing to obtain the desired results. In addition to the process, the present description also provides exemplary descriptions of a device for performing shear assisted extrusion. In one configuration this device has a scroll face configured to apply a rotational shearing force and an axial extrusion force to the same preselected location on material wherein a combination of the rotational shearing force and the axial extrusion force upon the same location cause a portion of the material to plasticize. The scroll face further has at least one groove and a portal defined within the scroll face. The groove is configured to direct the flow of plasticized material from a first location (typically on the face of the scroll) through the portal to a second location (typically on the back side of the scroll and in some place along a mandrel that has a die bearing surface). Wherein the plasticized material recombines after passage through the scroll face to form an extruded material having preselected features at or near these second locations.

This process provides for a significant number of advantages and industrial applications. For example, this technology enables the extrusion of metal wires, bars, and tubes used for vehicle components with 50 to 100 percent greater ductility and energy absorption over conventional extrusion technologies, while dramatically reducing manufacturing costs. This while being performed on smaller and less expensive machinery that what is used in conventional extrusion equipment. Furthermore, this process yields extrusions from lightweight materials like magnesium and aluminum alloys with improved mechanical properties that are impossible to achieve using conventional extrusion, and can do directly from powder, flake, or billets in just one single step, which dramatically reduces the overall energy consumption and process time compared to conventional extrusion.

Applications of the present process and device could, for example, be used to forming parts for the front end of an automobile wherein it is predicted that a 30 percent weight savings can be achieved by replacing aluminum components with lighter-weight magnesium, and a 75 percent weight savings can be achieved by replacing steel with magnesium. Typically processing into such embodiments have required the use of rare earth elements into the magnesium alloys. However, these rare earth elements are expensive and rare and in many instances are found in areas of difficult circumstances. Making magnesium extrusions too expensive for all but the most exotic vehicles. As a result, less than 1 percent of the weight of a typical passenger vehicle comes from magnesium. The processes and devices described hereafter however enable the use of non-rare earth magnesium alloys to achieve comparable results as those alloys that use the rare earth materials. This results in additional cost saving in addition to a tenfold reduction in power consumption—attributed to significantly less force required to produce the extrusions—and smaller machinery footprint requirements.

As a result the present technology could find ready adaptation in the making of lightweight magnesium components for automobiles such as front end bumper beams and crush cans. In addition to the automobile, deployments of the present invention can drive further innovation and development in a variety of industries such as aerospace, electric power industry, semiconductors and more. For example, this technique could be used to produce creep-resistant steels for heat exchangers in the electric power industry, and high-conductivity copper and advanced magnets for electric motors. It has also been used to produce high-strength aluminum rods for the aerospace industry, with the rods extruded in one single step, directly from powder, with twice the ductility compared to conventional extrusion. In addition, the solid-state cooling industry is investigating the use of these methods to produce semiconducting thermoelectric materials.

The process of the present description allow precise control over various features such as grain size and crystallographic orientation—characteristics that determine the mechanical properties of extrusions, like strength, ductility and energy absorbency. The technology produces a grain size for magnesium and aluminum alloys at an ultra-fine regime (<1 micron), representing a 10 to 100 times reduction compared to the starting material. In magnesium, the crystallographic orientation can be aligned away from the extrusion direction, which is what gives the material such high energy absorption. A shift of 45 degrees has been achieved, which is ideal for maximizing energy absorption in magnesium alloys. Control over grain refinement and crystallographic orientation is gained through adjustments to the geometry of the spiral groove, the spinning speed of the die, the amount of frictional heat generated at the material-die interface, and the amount of force used to push the material through the die.

In addition this extrusion process allows industrial-scale production of materials with tailored structural characteristics. Unlike severe plastic deformation techniques that are only capable of bench-scale products, ShAPE is scalable to industrial production rates, lengths, and geometries. In addition to control of the grain size, an additional layer of microstructural control has been demonstrated where grain size and texture can be tailored through the wall thickness of tubing—important because mechanical properties can now be optimized for extrusions depending on whether the final application experiences tension, compression, or hydrostatic pressure. This could make automotive components more resistant to failure during collisions while using much less material.

The process's combination of linear and rotational shearing results in 10 to 50 times lower extrusion force compared to conventional extrusion. This means that the size of hydraulic ram, supporting components, mechanical structure, and overall footprint can be scaled down dramatically compared to conventional extrusion equipment—enabling substantially smaller production machinery, lowering capital expenditures and operations costs. This process generates all the heat necessary for producing extrusions via friction at the interface between the system's billet and scroll-faced die, thus not requiring the pre-heating and external heating used by other methods. This results in dramatically reduced power consumption; for example, the 11 kW of electrical power used to produce a 2-inch diameter magnesium tube takes the same amount of power to operate a residential kitchen oven—a ten- to twenty-fold decrease in power consumption compared to conventional extrusion. Extrusion ratios up to 200:1 have been demonstrated for magnesium alloys using the described process compared to 50:1 for conventional extrusion, which means fewer to no repeat passes of the material through the machinery are needed to achieve the final extrusion diameter—leading to lower production costs compared to conventional extrusion.

Finally, studies have shown a 10 times decrease in corrosion rate for extruded non-rare earth ZK60 magnesium performed under this process compared to conventionally extruded ZK60. This is due to the highly refined grain size and ability to break down, evenly distribute—and even dissolve—second-phase particles that typically act as corrosion initiation sites. The instant process has also been used to clad magnesium extrusions with aluminum coating in order to reduce corrosion.

Various advantages and novel features of the present disclosure are described herein and will become further readily apparent to those skilled in this art from the following detailed description. In the preceding and following descriptions exemplary embodiments of the disclosure have been provided by way of illustration of the best mode contemplated for carrying out the disclosure. As will be realized, the disclosure is capable of modification in various respects without departing from the disclosure. Accordingly, the drawings and description of the preferred embodiment set forth hereafter are to be regarded as illustrative in nature, and not as restrictive.

BRIEF DESCRIPTION OF THE DRAWINGS

FIG. 2b shows a bottom perspective view of a modified scroll face that operates like a portal bridge die.

FIG. 4b shows an example of the scrolled face of the rotating tool in FIG. 4a

DETAILED DESCRIPTION OF THE INVENTION

The following description including the attached pages provide various examples of the present invention. It will be clear from this description of the invention that the invention is not limited to these illustrated embodiments but that the invention also includes a variety of modifications and embodiments thereto. Therefore, the present description should be seen as illustrative and not limiting. While the invention is susceptible to various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

In the previously described and related applications various methods and techniques are described wherein the described technique and device (referred to as ShAPE) is shown to provide a number of significant advantages including the ability to control microstructure such as crystallographic texture through the cross sectional thickness, while also providing the ability to perform various other tasks. In this description we provide information regarding the use of the ShAPE technique to form materials with non-circular hollow profiles as well as methods for creating high entropy alloys that are useful in a variety of applications such as projectiles. Exemplary applications will be discussed on more detail in the following.

Figure 1A:
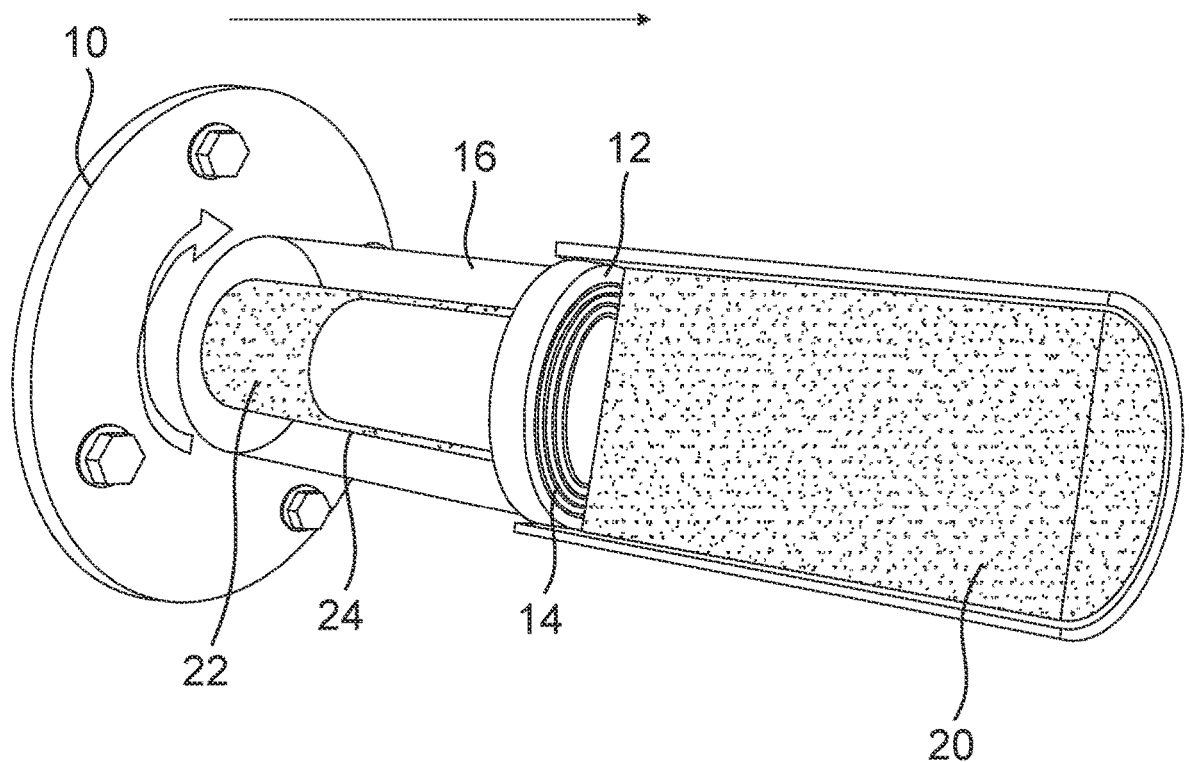
FIG. 1a shows a ShAPE setup for extruding hollow cross section pieces
Figure 1B:
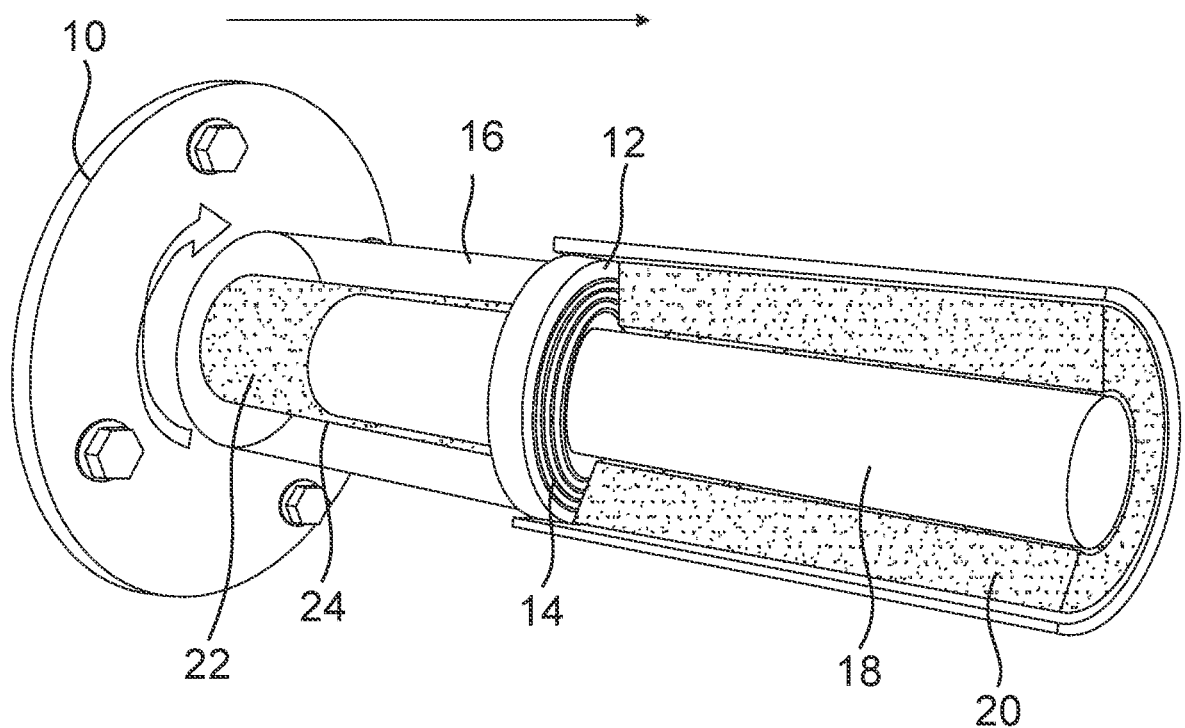
FIG. 1b shows another configuration for extruding hollow cross-sectional pieces.

Referring first now to FIGS. 1a and 1b, examples of the ShAPE device and arrangement are provided. In an arrangement such as the one shown in FIG. 1a rotating die 10 is thrust into a material 20 under specific conditions whereby the rotating and shear forces of the die face 12 and the die plunge 16 combine to plasticize the material 20 at the interface of the die face 12 and the material 20 and cause the plasticized material to flow in desired direction. (In other embodiments the material 20 may spin and the die 10 pushed axially into the material 20 so as to provide this combination of forces at the material face.) In either instance, the combination of the axial and the rotating forces plasticize the material 20 at the interface with the die face 12. Flow of the plasticized material can then be directed to another location wherein a die bearing surface 24 of a preselected length facilitates the recombination of the plasticized material into an arrangement wherein a new and better grain size and texture control at the micro level can take place. This then translates to an extruded product 22 with desired characteristics. This process enables better strength and corrosion resistance at the macro level together with increased and better performance. This process eliminates the need for additional heating and curing, and enables the functioning of the process with a variety of forms of material including billet, powder or flake without the need for extensive preparatory processes such as "steel canning". This arrangement also provides for a methodology for performing other steps such as cladding, enhanced control for through wall thickness and other characteristics.

This arrangement is distinct from and provides a variety of advantages over the prior art methods for extrusion. First, during the extrusion process the force rises to a peak in the beginning and then falls off once the extrusion starts. This is called breakthrough. In this ShAPE process the temperature at the point of breakthrough is very low. For example for Mg tubing, the temperature at breakthrough for the 2" OD, 75 mil wall thickness ZK60 tubes is <150 C. This lower temperature breakthrough is believed in part to account for the superior configuration and performance of the resulting extrusion products.

Another feature is the low extrusion coefficient kf which describes the resistance to extrusion (i.e. lower kf means lower extrusion force/pressure). Kf is calculated to be 2.55 MPa and 2.43 MPa for the extrusions made from ZK60-T5 bar and ZK60 cast respectively (2" OD, 75 mil wall thickness). The ram force and kf are remarkably low compared to conventionally extruded magnesium where kf ranges from 68.9-137.9 MPa. As such, the ShAPE process achieved a 20-50 times reduction in kf (as thus ram force) compared to conventional extrusion. This assists not only with regard to the performance of the resulting materials but also reduced energy consumption required for fabrication. For example, the electrical power required to extrude the ZK60-T5 bar and ZK60 cast (2" OD, 750 mil wall thickness) tubes is 11.5 kW during the process. This is much lower than a conventional approach that uses heated containers/billets.

The ShAPE process is significantly different than Friction Stir Back Extrusion (FSBE). In FSBE, a spinning mandrel is rammed into a contained billet, much like a drilling operation. Scrolled grooves force material outward and material back extrudes around the mandrel to form a tube, not having been forced through a die. As a result, only very small extrusion ratios are possible, the tube is not fully processed through the wall thickness, the extrudate is not able to push off of the mandrel, and the tube length is limited to the length of the mandrel. In contrast, ShAPE utilizes spiral grooves on a die face to feed material inward through a die and around a mandrel that is traveling in the same direction as the extrudate. As such, a much larger outer diameter and extrusion ratio are possible, the material is uniformly process through the wall thickness, the extrudate is free to push off the mandrel as in conventional extrusion, and the extrudate length is only limited only by the starting volume of the billet.

An example of an arrangement using a ShAPE device and a mandrel 18 is shown in FIG. 1b. This device and associated processes have the potential to be a low-cost, manufacturing technique to fabricate variety of materials. As will be described below in more detail, in addition to modifying various parameters such as feed rate, heat, pressure and spin rates of the process, various mechanical elements of the tool assist to achieve various desired results. For example, varying scroll patterns 14 on the face of extrusion dies 12 can be used to affect/control a variety of features of the resulting materials. This can include control of grain size and crystallographic texture along the length of the extrusion and through-wall thickness of extruded tubing and other features. Alteration of parameters can be used to advantageously alter bulk material properties such as ductility and strength and allow tailoring for specific engineering applications including altering the resistance to crush, pressure or bending.

The ShAPE process has been utilized to form various structures from a variety of materials including the arrangement as described in the following table.

TABLE 1

| PUCKS Alloy | Material Class | Precursor Form |
|---|---|---|
| $Bi_2Te_3$ | Thermoelectric | Powder |
| Fe-Si | Magnet | Powder |
| $Nd_2Fe_{11}B/Fe$ | Magnet | Powder |
| MA956 | ODS Steel | Powder |
| Nb 0.95 Ti 0.05 Fe 1 Sb 1 | Thermoelectric | Powder |
| Mn-Bi | Magnet | Powder |
| AlCuFe(Mg)Ti | High Entropy Alloy | Chunks |

TABLE 1-continued

| TUBES Alloy | Material Class | Precursor Form |
|---|---|---|
| ZK60 | Magnesium Alloy | Barstock, As-Cast Ingot |
| AZ31 | Magnesium Alloy | Barstock |
| AZ91 | Magnesium Alloy | Flake, Barstock, As-Cast Ingot |
| $Mg_2Si$ | Magnesium Alloy | As-Cast Ingot |
| $Mg_7Si$ | Magnesium Alloy | As-Cast Ingot |
| AZ91-1, 5 and 10 wt. % $Al_2O_3$ | Magnesium MMC | Mechanically Alloyed Flake |
| AZ91-1, 5 and 10 wt. % $Y_2O_3$ | Magnesium MMC | Mechanically Alloyed Flake |
| AZ91-1, 5 and 10 and 5 wt. % SiC | Magnesium MMC | Mechanically Alloyed Flake |

| RODS Alloy | Material Class | Precursor Form |
|---|---|---|
| Al-Mn wt. 15% | Aluminum Manganese Alloy | As-Cast |
| Al-Mg | Mg Al Co-extrusion | Barstock |
| Mg-Dy-Nd-Zn-Zr | Magnesium Rare Earth | Barstock |
| Cu | Pure Copper | Barstock |
| Mg | Pure Magnesium | Barstock |
| AA6061 | Aluminum | Barstock |
| AA7075 | High Strength Aluminum | Barstock |
| Al-Ti-Mg-Cu-Fe | High Entropy Alloy | As-Cast |
| Al-1, 5, 10 at. % Mg | Magnesium Alloy | As-Cast |
| A-12.4TM | High Strength Aluminum | Powder |
| Rhodium | Pure Rhodium | Barstock |

In addition, to the pucks, rods and tubes described above, the present disclosure also provides a description of the use of a specially configured scroll component referred by the inventors as a portal bridge die head which allows for the fabrication of ShAPE extrusions with non-circular hollow profiles. This configuration allows for making extrusion with non-circular, and multi-zoned, hollow profiles using a specially formed portal bridge die and related tooling.

Figure 2A:
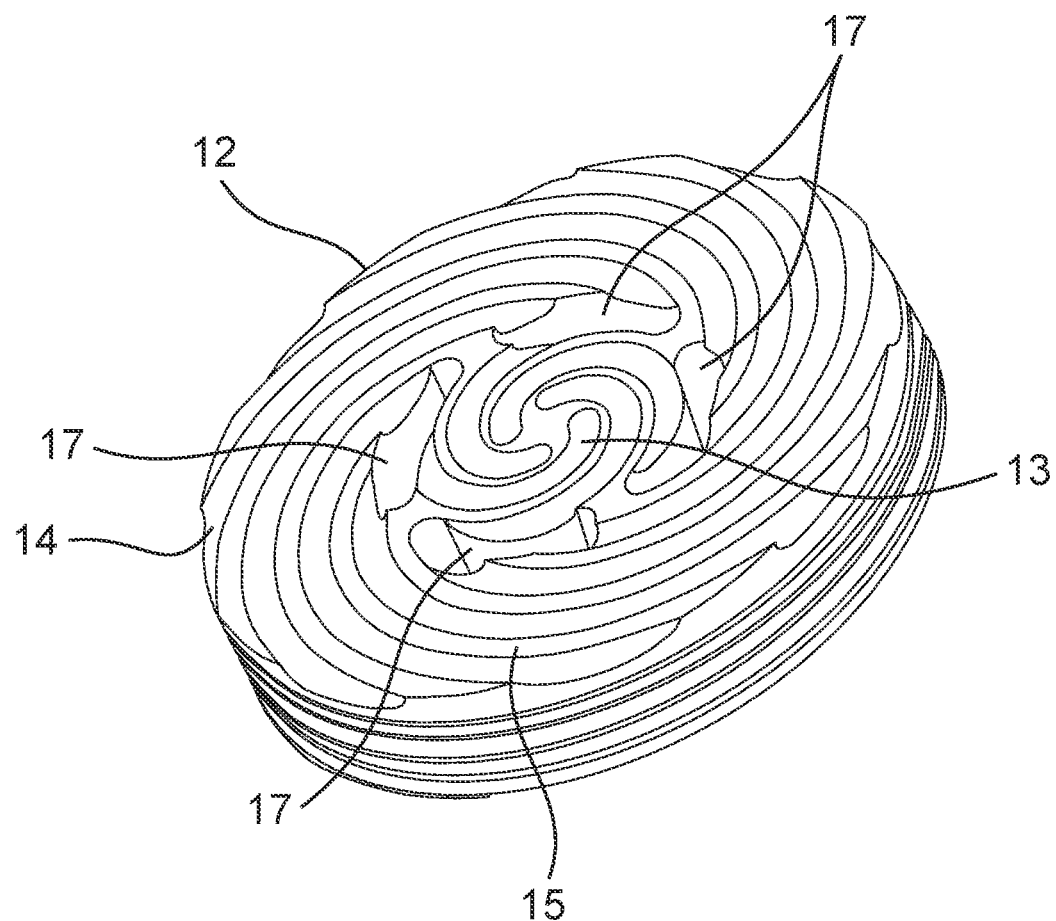
FIG. 2a shows a top perspective view of a modified scroll face tool for a portal bridge die.
Figure 2C:
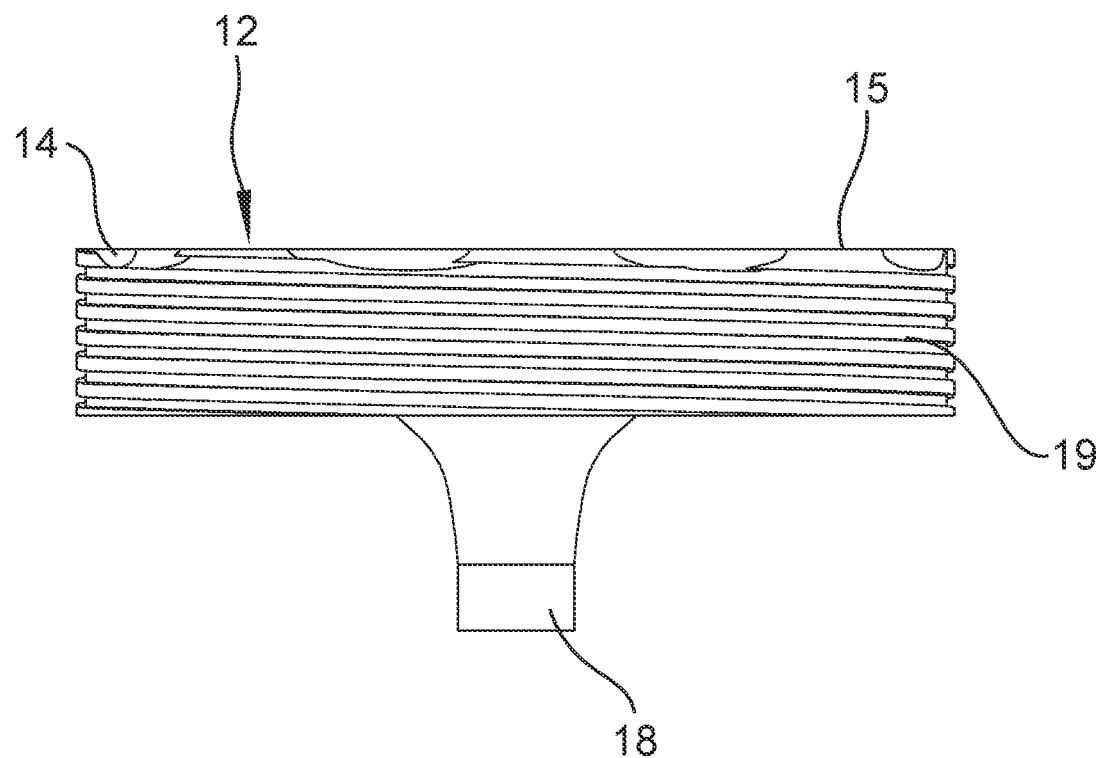
FIG. 2c shows a side view of the modified portal bridge die

FIGS. 2a-2c show various views of a portal bridge die design with a modified scroll face that unique to operation in the ShAPE process. FIG. 2a shows an isometric view of the scroll face on top of the a portal bridge die and FIG. 2b) shows an isometric view of the bottom of the portal bridge die with the mandrel visible.

In the present embodiment grooves 13, 15 on the face 12 of the die 10 direct plasticized material toward the aperture ports 17. Plasticized material then passes through the aperture ports 17 wherein it is directed to a die bearing surface 24 within a weld chamber similar to conventional portal bridge die extrusion. In this illustrative example, material flow is separated into four distinct streams using four ports 17 as the billet and the die are forced against one another while rotating.

While the outer grooves 15 on the die face feed material inward toward the ports 17, inner grooves 13 on the die face feed material radially outward toward the ports 17. In this illustrative example, one groove 13 is feeding material radially outward toward each port 17 for a total of four outward flowing grooves. The outer grooves 15 on the die surface 12 feed material radially inward toward the port 17. In this illustrative example, two sets of grooves are feeding material radially inward toward each port 17 for a total of eight inward feeding grooves 15. In addition to these two sets of grooves, a perimeter groove 19 on the outer perimeter of the die, shown in FIG. 2C, is oriented counter to the die rotation so as to provide back pressure thereby minimizing material flash between the container and die during extrusion.

FIG. 2B shows a bottom perspective view of the portal bridge die 12. In this view, the die shows a series of full penetration of ports 17. In use, streams of plasticized material tunneled by the inward 15 and outward 13 directed grooves described above pass through these ports 17 and then are recombined in a weld chamber 21 and then flow around a mandrel 18 to create a desired cross section. The use of scrolled grooves 13, 15, 19 to feed the ports 17 during rotation—as a means to separate material flow of the feedstock (e.g. powder, flake, billet, etc.) into distinct flow streams has never been done to our knowledge. This arrangement enables the formation of items with noncircular hollow cross sections.

Figure 3:
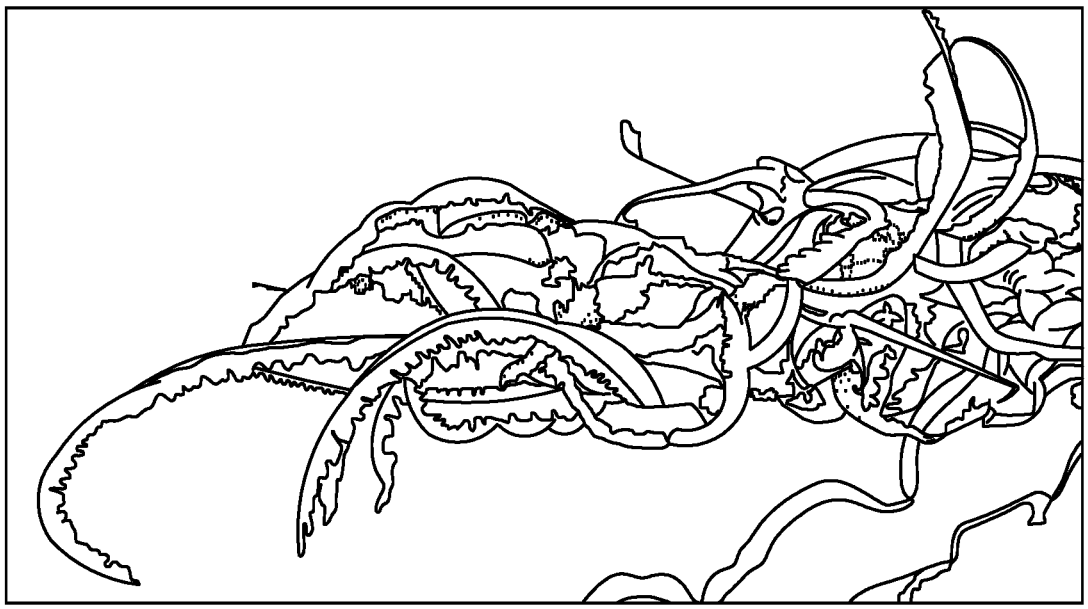
FIG. 3 shows an illustrative view of material separated device and process shown in FIGS. 1-2.

FIG. 3 shows a separation of magnesium alloy ZK60 into multiple streams using the portal bridge die approach during ShAPE processing. (In this case the material was allowed to separate for effect and illustration of the separation features and not passed over a die bearing surface for combination). Conventional extrusion does not rotate and the addition of grooves would greatly impede material flow. But when rotation is present, such as in ShAPE or friction extrusion, the scrolls not only assist flow, but significantly assist the functioning of a portal bridge die extrusion and the subsequent formation of non-circular hollow profile extrusions. Without scrolled grooves feeding the portals, extrusion via the portal bridge die approach using a process where rotation is involved, such as ShAPE, would be ineffective for making items with such a configuration. The prior art conventional linear extrusion process teach away from the use of surface features to guide material into the portals 17 during extrusion.

In the previously described and related applications various methods and techniques are described wherein the ShAPE technique and device is shown to provide a number of significant advantages including the ability to control microstructure such as crystallographic texture through the cross sectional thickness, while also providing the ability to perform various other tasks. In this description we provide information regarding the use of the ShAPE technique to form materials with non-circular hollow profiles as well as methods for creating high entropy alloys that are useful in a variety of applications such as projectiles. These two exemplary applications will be discussed on more detail in the following.

Figure 4A:
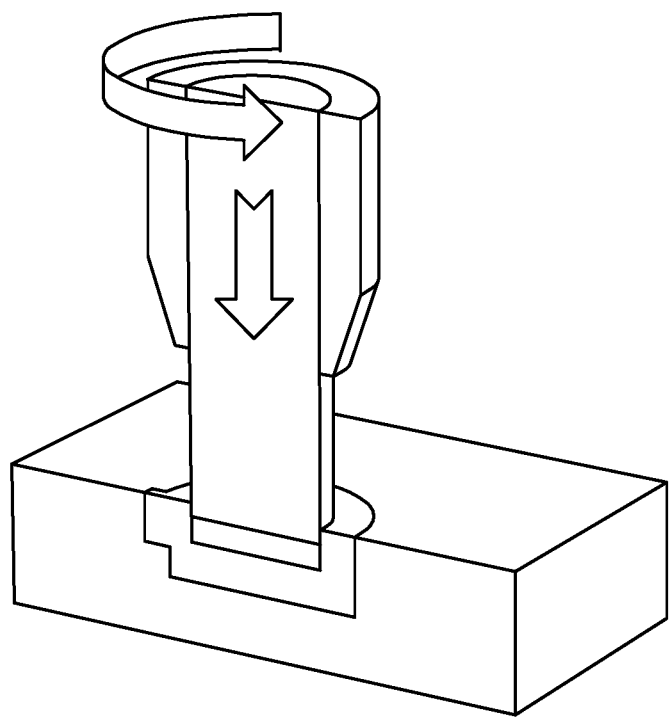
FIG. 4a shows a ShAPE set up for consolidating high entropy alloys (HEAs) from arc melted pucks into densified pucks.
Figure 4B:
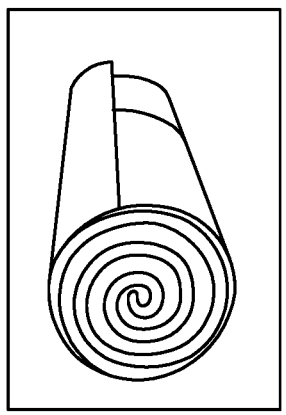

FIG. 4a shows a schematic of the ShAPE process which utilizes a rotating tool to apply load/pressure and at the same time the rotation helps in applying torsional/shear forces, to generate heat at the interface between the tool and the feedstock, thus helping to consolidate the material. In this particular embodiment the arrangement of the ShAPE setup is configured so as to consolidate high entropy alloy (HEA) arc-melted pucks into densified pucks. In this arrangement the rotating ram tool is made from an Inconel alloy and has an outer diameter (OD) of 25.4 mm, and the scrolls on the ram face were 0.5 mm in depth and had a pitch of 4 mm with a total of 2.25 turns. In this instance the ram surface incorporated a thermocouple to record the temperature at the interface during processing. (see FIG. 4b) The setup enables the ram to spin at speeds from 25 to 1500 RPM.

In use, both an axial force and a rotational force are applied to a material of interest causing the material to plasticize. In extrusion applications, the plasticized material then flows over a die bearing surface dimensioned so as to allow recombination of the plasticized materials in an arrangement with superior grain size distribution and alignment than what is possible in traditional extrusion processing. As described in the prior related applications this process provides a number of advantages and features that conventional prior art extrusion processing is simply unable to achieve.

High entropy alloys are generally solid-solution alloys made of five or more principal elements in equal or near equal molar (or atomic) ratios. While this arrangement can provide various advantages, it also provides various challenges particularly in forming. While a conventional alloys is typically comprise one principal element that largely governs the basic metallurgy of that alloy system (e.g. nickel-base alloys, titanium-base alloys, aluminum-base alloys, etc.) in an HEA each of the five (or more) constituents of HEAs can be considered as the principal element. Advances in production of such materials may open the doors to their eventual deployment in various applications. However, standard forming processes have demonstrated significant limitations in this regard. Utilization of the ShAPE type of process demonstrates promise in obtaining such a result.

Figure 4C:
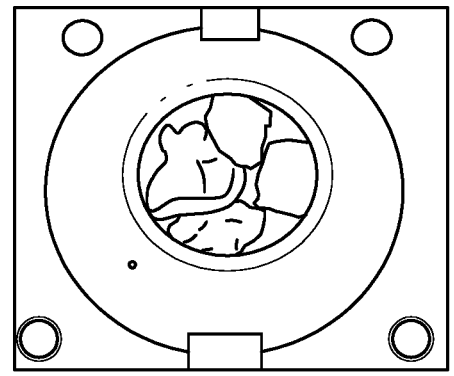
FIG. 4c shows an example of HEA arc melted samples crushed and placed inside the chamber of the ShAPE device prior to processing.

In one example a "low-density" AlCuFe(Mg) Ti HEA was formed. Beginning with arc-melted alloy buttons as a precursor, the ShAPE process was used to simultaneously heat, homogenize, and consolidate the HEA resulting in a material that overcame a variety of problems associated with prior art applications and provided a variety of advantages. In this specific example, HEA buttons were arc-melted in a furnace under $10^{-6}$ Torr vacuum using commercially pure aluminum, magnesium, titanium, copper and iron. Owing to the high vapor pressure of magnesium, a majority of magnesium vaporized and formed Al1 Mg0.1Cu2.5Fe1Ti1.5 instead of the intended Al1 Mg1Cu1Fe1Ti1 alloy. The arc melted buttons described in the paragraph above were easily crushed with hammer and used to fill the die cavity/powder chamber (FIG. 4c), and the shear assisted extrusion process initiated. The volume fraction of the material filled was less than 75%, but was consolidated when the tool was rotated at 500 RPM under load control with a maximum load set at 85 MPa and at 175 MPa.

Figure 5:
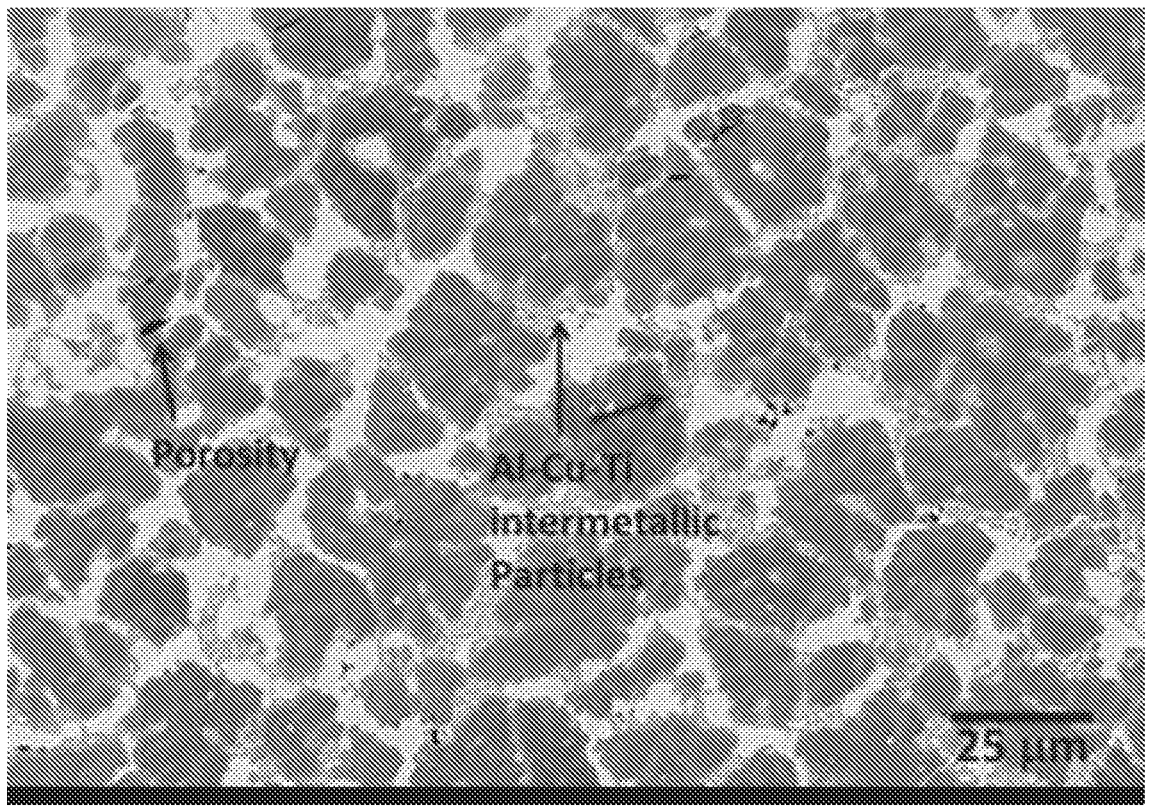
FIG. 5 shows BSE-SEM image of cross section of the HEA arc melted samples before ShAPE processing, showing porosity, intermetallic phases and cored, dendritic microstructure.

Comparison of the arc-fused material and the materials developed under the ShAPE process demonstrated various distinctions. The arc melted buttons of the LWHEA exhibited a cored dendritic microstructure along with regions containing intermetallic particles and porosity. Using the ShAPE process these microstructural defects were eliminated to form a single phase, refined grain and no porosity LWHEA sample FIG. 5a shows the backscattered SEM (BSE-SEM) image of the as-cast/arc-melted sample. The arc melted samples had a cored dendritic microstructure with the dendrites rich in iron, aluminum and titanium and were 15-30 μm in diameter, whereas the inter-dendritic regions were rich in copper, aluminum and magnesium. Aluminum was uniformly distributed throughout the entire microstructure. Such microstructures are typical of HEA alloys. The inter-dendritic regions appeared to be rich in Al—Cu—Ti intermetallic and was verified by XRD as $AlCu_2Ti$. XRD also confirmed a $Cu_2Mg$ phase which was not determined by the EDS analysis and the overall matrix was BCC phase. The intermetallics formed a eutectic structure in the inter-dendritic regions and were approximately 5-10 μm in length and width. The inter-dendritic regions also had roughly 1-2 vol % porosity between them and hence was difficult to measure the density of the same.

Typically such microstructures are homogenized by sustained heating for several hours to maintain a temperature near the melting point of the alloy. In the absence of thermodynamic data and diffusion kinetics for such new alloy systems the exact points of various phase formations or precipitation is difficult to predict particularly as related to various temperatures and cooling rates. Furthermore, unpredictability with regard to the persistence of intermetallic phases even after the heat treatment and the retention of their morphology causes further complications. A typical lamellar and long intermetallic phase is troublesome to deal with conventional processing such as extrusion and rolling and is also detrimental to the mechanical properties (elongation).

The use of the ShAPE process enabled refinement of the microstructure without performing homogenization heat treatment and provides solutions to the aforementioned complications. The arc melted buttons, because of the presence of their respective porosity and the intermetallic phases, were easily fractured into small pieces to fill in the die cavity of the ShAPE apparatus. Two separate runs were performed as described in Table 1 with both the processes' yielding a puck with diameter of 25.4 mm and approximately 6 mm in height. The pucks were later sectioned at the center to evaluate the microstructure development as a function of its depth. Typically in the ShAPE consolidation process; the shearing action is responsible for deforming the structure at interface and increasing the interface temperature; which is proportional to the rpm and the torque; while at the same time the linear motion and the heat generated by the shearing causes consolidation. Depending on the time of operation and force applied near through thickness consolidation can also be attained.

TABLE 2

Consolidation processing conditions utilized for LWHEA

| Run # | Pressure (MPa) | Tool RPM | Process Temperature | Dwell Time |
|---|---|---|---|---|
| 1 | 175 | 500 |  | 180 s |
| 2 | 85 | 500 | 600° C. | 180 s |

Figure 6A:
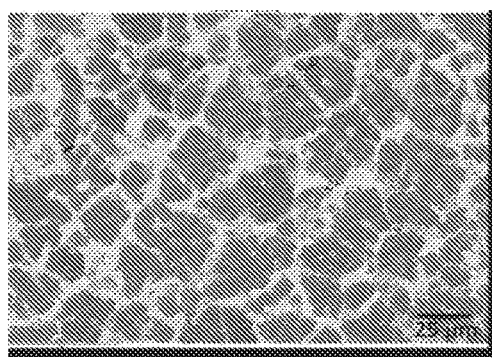
FIG. 6a shows BSE-SEM images at the bottom of the puck resulting from the processing of the material in FIG. 4c.
Figure 6B:
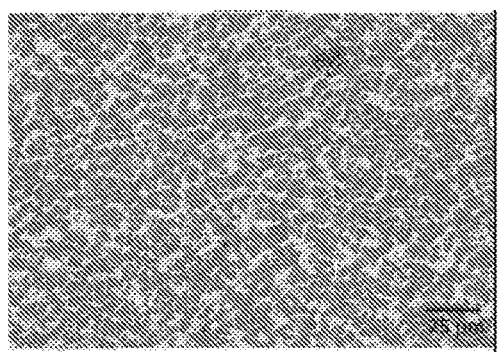
FIG. 6b shows BSE-SEM images halfway through the puck
Figure 6C:
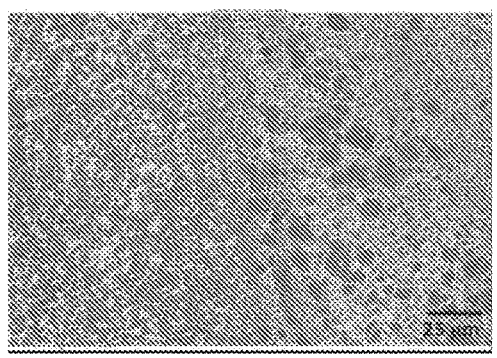
FIG. 6c shows BSE-SEM images of the interface between high shear region un-homogenized region (approximately 0.3 mm from puck surface)
Figure 6D:
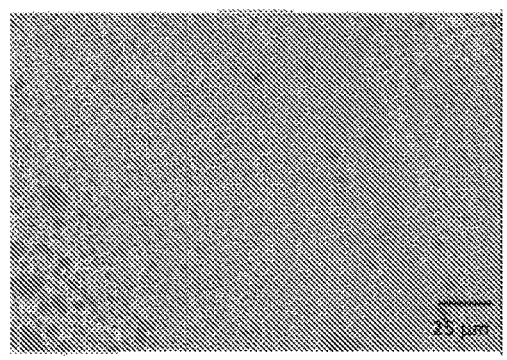
FIG. 6d shows BSE-SEM images of a high shear region

FIGS. 6a-6d show a series of BSE-SEM images ranging from the essentially unprocessed bottom of the puck to the fully consolidated region at the tool billet interface. There appears to be a gradual change in microstructure from the bottom of the puck to the interface. The bottom of the puck had the microstructure similar to one described in FIG. 5. But as the puck is examined moving towards the interface the size of these dendrites become closely spaced (FIG. 6b). The intermetallic phases are still present in the inter-dendritic regions but the porosity is completely eliminated. On the macro scale the puck appears more contiguous and without any porosity from the top to the bottom $\frac{3}{4}^{th}$ section. FIG. 6c shows the interface where the shearing action is more prominent. This region clearly demarcates the as-cast cast dendritic structure to the mixing and plastic deformation caused by the shearing action. A helical pattern is observed from this region to the top of the puck. This is indicative of the stirring action and due to the scroll pattern on the surface of the tool. This shearing action also resulted in the comminution of the intermetallic particles and also assisted in the homogenizing the material as shown in FIGS. 6c and 6d. It should be noted that this entire process lasted only 180 seconds to homogenize and uniformly disperse and comminute the intermetallic particles. The probability that some of these getting intermetallic particles re-dissolved into the matrix is very high. The homogenized region was nearly 0.3 mm from the surface of the puck.

The use of the ShAPE device and technique demonstrated a novel single step method to process without preheating of the billets. The time required to homogenize the material was significantly reduced using this novel process. Based on the earlier work, the shearing action and the presence of the scrolls helped in comminution of the secondary phases and resulted in a helical pattern. All this provides significant opportunities towards cost reduction of the end product without compromising the properties and at the same time tailoring the microstructure to the desired properties.

In as much as types of alloys exhibit high strength at room temperature and at elevated temperature, good machinability, high wear and corrosion resistance. Such materials could be seen as a replacement in a variety of applications. A refractory HE-alloy could replace expensive super-alloys used in applications such as gas turbines and the expensive Inconel alloys used in coal gasification heat exchanger. A light-weight HE-alloy could replace Aluminum and Magnesium alloys for vehicle and airplanes. Use of the ShAPE process to perform extrusions would enable these types of deployments.

While various preferred embodiments of the invention are shown and described, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A shear assisted extrusion process comprising;
providing both axial and rotational forces between feedstock material in a container comprising a die cavity and a scroll-faced-die to plasticize one end of the feedstock material and provide plasticized feedstock material through at least one opening in the scroll-faced-die and over a mandrel coupled to the scroll-faced-die to form a hollow extrudate,
wherein:
the feedstock material comprises crushed material fragments comprising chunks, powder, or flakes, or combinations thereof; and
a scroll-face of the scroll-faced-die defines spirals as channels or ridges upon the scroll-face to direct the plasticized feedstock material through the at least one opening in the scroll-faced-die;
wherein the scroll-face is oriented generally perpendicular to a direction of an axial force imparted by the scroll-faced-die against the feedstock material or vice versa.

2. The process of claim 1, wherein the spirals have between 1 and 16 starts.

3. The process of claim 1, wherein the at least one opening of the scroll-faced-die is contiguous with at least one channel of the scroll-face.

4. The process of claim 3, wherein the at least one opening of the scroll-face is contiguous with at least two channels of the scroll-face.

5. The process of claim 3, wherein the at least one opening of the scroll-faced-die comprises a plurality of openings.

6. The process of claim 5, wherein each of the openings is contiguous with at least one channel.

7. The process of claim 5, wherein the plasticized feedstock material extends through each of the openings and merges to form a single extrudate.

8. The process of claim 1, wherein the crushed material fragments comprises crushed arc-melted alloy buttons.

9. The process of claim 8, wherein the crushed arc-melted alloy buttons comprise aluminum, magnesium, titanium, copper, and iron.

10. The process of claim 1, wherein the crushed material fragments comprises a high entropy alloy or precursor thereof.

11. The process of claim 1, wherein crushed material fragments comprise at least one of copper, aluminum, magnesium, or combinations thereof.

12. The process of claim 11, wherein the crushed material fragments are consolidated in response to the scroll-faced-die being rotated at 500 RPM under load control with a maximum load set at 85 MPa.

13. The process of claim 11, wherein the crushed material fragments are consolidated in response to the scroll-faced-die being rotated at 500 RPM under load control with a maximum load set at 175 MPa.

14. A system for shear-assisted extrusion, the system comprising:
a container for a feedstock material;
a portal bridge die having a scroll face with a plurality of spiral grooves defined therein, the portal bridge die configured to be rotated relative to the feedstock material or vice versa;
a ram configured to establish an axial extrusion force simultaneously with rotation of the portal bridge die or the container;
wherein the axial extrusion force and the rotation plasticize the feedstock material against the scroll face; and
wherein the grooves of the portal bridge die are configured to direct plasticized feedstock material from a first location at an interface between the feedstock material and the scroll face through the die via multiple portals defined within the scroll face and over a mandrel of the portal bridge die to form a hollow extrudate;
wherein the scroll face is oriented generally perpendicular to a direction of the axial extrusion force.

15. The system of claim 14, wherein the plasticized feedstock material separates into respective streams of material passing through the respective portals.

16. The system of claim 15, wherein the respective streams of material recombine to form the hollow extrudate.

17. The system of claim 16, wherein the hollow extrudate comprises a non-circular profile.

18. The system of claim 17, wherein the non-circular profile is defined at least in part by the mandrel.

19. The system of claim 18, wherein the portal bridge die defines the mandrel.

20. The system of claim 14, wherein a respective portal in the scroll face is contiguous with grooves of the scroll face.

21. The system of claim 14, wherein the scroll face defines a first groove having a first orientation to direct material radially outward from a center of the scroll face toward a respective portal, and a second groove having an opposite second orientation to direct material radially inward toward a center of the scroll face from a periphery, toward the respective portal.

22. The system of claim 14, wherein the feedstock material comprises at least one of copper, aluminum, magnesium, or combinations thereof.

23. The system of claim 22, wherein the feedstock material comprises an alloy.

24. The system of claim 22, wherein the feedstock material comprises a magnesium alloy in billet form;
wherein the ram is configured to establish the axial extrusion force at or below 25 MPa; and
wherein the system is configured to control the rotation and axial extrusion force to maintain a temperature of the plasticized material less than 100° C.

25. The system of claim 14, wherein the feedstock material comprises crushed material fragments comprising chunks, powder, or flakes, or combinations thereof.

26. The system of claim 14, wherein the feedstock material comprises precursor materials for a high entropy alloy; and
wherein the plasticized material forms a high entropy alloy extrudate.

27. The system of claim 14, wherein the feedstock material comprises crushed arc-melted alloy buttons.

28. The system of claim 14, wherein the container is configured to rotate relative to the portal bridge die.

* * * * *